United States Patent
Azar et al.

(10) Patent No.: US 6,485,096 B1
(45) Date of Patent: Nov. 26, 2002

(54) CONTINUOUS SELF-ADJUSTING HEAD RESTRAINT SYSTEM

(75) Inventors: Hussam Azar, Southfield, MI (US); Mari C. Milosic, Grosse Pointe Park, MI (US); Manoj Srivastava, Rochester Hills, MI (US); Omar D. Tame, West Bloomfield, MI (US); Kevin John Ventura, Grosse Pointe Park, MI (US); Jacob Aaron Bontekoe, Linden, MI (US)

(73) Assignee: Intier Automotive Inc., Aurora (CA)

( * ) Notice: Subject to any disclaimer, the term of this patent is extended or adjusted under 35 U.S.C. 154(b) by 0 days.

(21) Appl. No.: 10/009,702

(22) PCT Filed: Jun. 12, 2000

(86) PCT No.: PCT/US00/16096

§ 371 (c)(1),
(2), (4) Date: Apr. 29, 2002

(87) PCT Pub. No.: WO00/76803

PCT Pub. Date: Dec. 21, 2000

Related U.S. Application Data

(60) Provisional application No. 60/138,366, filed on Jun. 10, 1999.

(51) Int. Cl.⁷ .............................................. A47C 1/036
(52) U.S. Cl. ......................................... 297/61; 297/408
(58) Field of Search ......................... 297/67, 408, 391, 297/216.12

(56) References Cited

U.S. PATENT DOCUMENTS

| | | | | |
|---|---|---|---|---|
| 3,712,666 A | * | 1/1973 | Stoll | 297/313 |
| 3,929,374 A | * | 12/1975 | Hogan et al. | 297/61 |
| 4,040,661 A | * | 8/1977 | Hogan et al. | 297/284.4 |
| 4,113,310 A | * | 9/1978 | Kapanka | 297/408 |
| 5,681,079 A | * | 10/1997 | Robinson | 297/378.12 |

FOREIGN PATENT DOCUMENTS

| | | | |
|---|---|---|---|
| EP | 0594527 A | * | 4/1994 |
| FR | 1244928 A | * | 1/1961 |
| FR | 2602133 A | * | 2/1988 |

* cited by examiner

Primary Examiner—Anthony D. Barfield
(74) Attorney, Agent, or Firm—Clark Hill PLC

(57) ABSTRACT

A seat assembly for use in an automotive vehicle comprises a generally horizontal seat cushion for supporting a seat occupant on the seat assembly and a seat back (36) pivotally connected to the seat cushion by a recliner (38) for pivotal movement between a generally upright position and a fully reclined position relative to the seat cushion. The seat assembly includes a head restraint (26) pivotally coupled to the seat back for pivotal movement between a normal position when the seat back is in the upright position and a forward angled position relative to the seat back when the seat back is in the fully reclined position to support the seat occupant's head. An adjustment mechanism comprises a guide plate (90) slidably coupled to the seat back for pivoting the head restraint between the normal position and the forward angled position. A cable (100) is coupled between the seat cushion and the guide plate mechanism for automatically sliding the adjustment mechanism between a first position pivoting the head restraint to the normal position and a second position pivoting the head restraint to the forward angled position in response to pivotal movement of the seat back between the upright position and the fully reclined position for continuously adjusting the position of the head restraint relative to the seat occupant's head. A spring (110) urges the guide plate toward the second position when the seat back is pivoted toward the fully reclined position.

8 Claims, 4 Drawing Sheets

CONTINUOUS SELF-ADJUSTING HEAD RESTRAINT SYSTEM

This application claims the benefit of provisional application 60/138,366 filed Jun. 10, 1999.

BACKGROUND OF THE INVENTION

1. Field of the Invention

The subject invention relates to a continuous self-adjusting head restraint system for a seat assembly, and more particularly, to a head restraint system which continuously and automatically adjusts its position in response to pivotal movement of a seat back relative to a seat cushion of the seat assembly.

2. Description of the Prior Art

Automotive vehicles include vehicle seat assemblies for supporting a seat occupant in the vehicle. The seat assemblies comprise a generally horizontal seat cushion and a generally upright seat back pivotally connected to the seat cushion by a recliner mechanism. The seat back is commonly pivotal about the seat cushion between a generally upright position and a fully reclined position. The seat assembly also commonly includes a head restraint coupled to the seat back for supporting the seat occupant's head. The head restraint is commonly adjustable, either manually or by power actuation, to adjust the height and/or pivotal displacement of the head restraint relative to the seat back.

However, it is desirable to automatically and continuously adjust the angle of the head restraint relative to the seat back in response to the seat back pivoting between the upright position and the fully reclined position.

SUMMARY OF THE INVENTION

The present invention relates to a seat assembly for use in an automotive vehicle comprising a generally horizontal seat cushion for supporting a seat occupant on the seat assembly and a seat back pivotally coupled to the seat cushion for pivotal movement between a generally upright position and a fully reclined position relative to the seat cushion. The seat assembly further includes a head restraint pivotally coupled to the seat back for pivotal movement between a normal position when the seat back is in the upright position and a forward angled position relative to the seat back when the seat back is in the fully reclined position to support the seat occupant's head. An adjustment mechanism is slidably coupled between the seat back and the head restraint for pivoting the head restraint between the normal position and the forward angled position. An actuator is coupled between the seat cushion and the adjustment mechanism for automatically sliding the adjustment mechanism between a first position pivoting the head restraint to the normal position and a second position pivoting the head restraint to the forward angled position in response to pivotal movement of the seat back between the upright position and the fully reclined position for continuously adjusting the position of the head restraint relative to the seat occupant's head.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
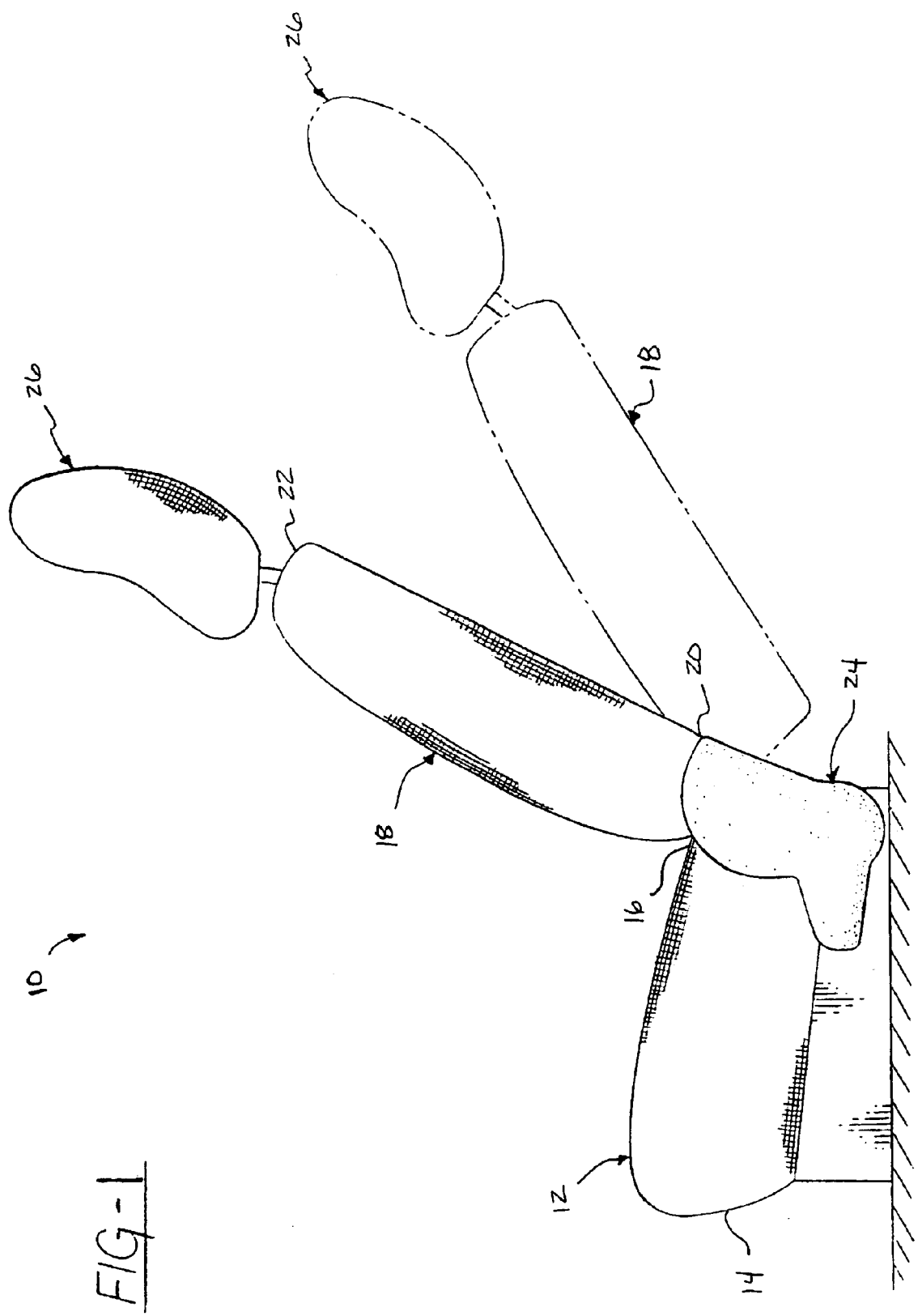
FIG. 1 is a side view of a seat assembly showing a head restraint in a normal in when a seat back is in an upright position and the head restraint in a forward angled position when the seat back is in a fully reclined position.

Referring to the Figures, a seat assembly is generally shown at 10 in FIG. 1 for use in an automotive vehicle. The seat assembly 10 includes a generally horizontal seat cushion 12 for supporting a seat occupant on the seat assembly 10. The seat cushion 12 has a front portion 14 and a rear portion 16 spaced opposite the front portion 14. The seat assembly 10 further includes a seat back 18 pivotally coupled to the seat cushion 12 for pivotal movement between a generally upright position, as shown in solid lines in FIG. 1, and a fully reclined position, as shown in dashed lines in FIG. 1, relative to the seat cushion 12. The seat back 18 includes a lower portion 20 adjacent the rear portion 16 of the seat cushion 12 and an upper portion 22 spaced opposite the lower portion 20. The lower portion 20 of the seat back 18 is pivotally connected to the rear portion 16 of the seat cushion 12 by a recliner mechanism 24, as conventionally known to one skilled in the art. The seat assembly 10 further comprises a head restraint 26 pivotally coupled to the upper portion 22 of the seat back 18 for pivotal movement between a normal position when the seat back 18 is in the upright position and a forward angled position relative to the seat back 18 when the seat back 18 is in the fully reclined position to support the seat occupant's head.

Figure 2:
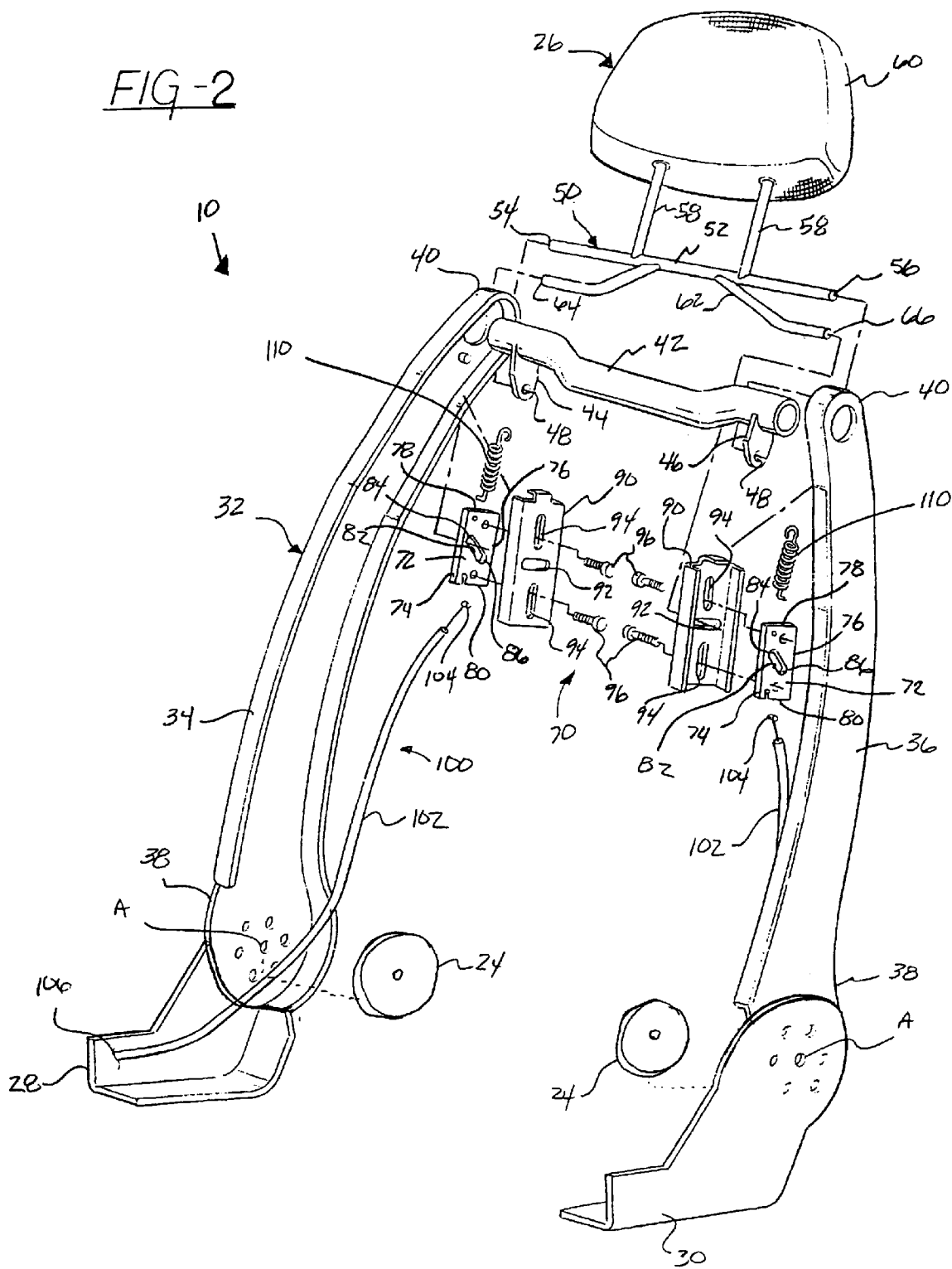
FIG. 2 is an exploded perspective view of the seat back, head restraint and an adjustment mechanism for pivoting the head restraint between the normal position and the forward angled position.

Referring to FIG. 2, a portion of the seat assembly 10 is shown in an exploded view. The seat cushion 12 includes a pair of seat cushion brackets 28, 30 for supporting the recliner mechanism 24 and defining a pivot axis A for the seat back 18. The seat back 18 includes a seat back frame 32 comprising a pair of spaced apart and generally parallel upright support rails 34, 36, each extending from a lower end 38 to an upper end 40. An upper cross rail 42 interconnects the upper ends 40 of the support rails 34, 36. The recliner mechanism 24 pivotally interconnects the lower ends 38 of the support rails 34, 36 to the respective seat cushion brackets 28, 30. The upper cross rail 42 includes a pair of spaced apart pivot brackets 44, 46 projecting downwardly therefrom and each having a pivot bore 48 passing therethrough.

The head restraint 26 further includes a support frame 50 comprising a cross bar 52 extending between opposing first 54 and second 56 distal ends, each pivotally coupled in the pivot bore 48 of the respective pivot brackets 44, 46. A pair of spaced apart and parallel upstanding posts 58 project upwardly from the cross bar 52 for supporting a head restraint cushion 60. The cushion 60 may be a resilient foam pad, such as urethane foam, encased by a trim cover material of cloth, vinyl or leather as conventionally known in the art. The support frame 50 further includes a control bar 62 connected to the cross bar 52 and extending downwardly and generally parallel thereto between first 64 and second 66 distal ends. The first 64 and second 66 distal ends of the control bar 62 are operatively coupled to the support rails 34, 36, respectively, for pivoting the head restraint 26 about the cross bar 52 between the normal position and the forward angled position as will be described in greater detail hereinbelow.

Still referring to FIG. 2, the seat assembly 10 further includes an adjustment mechanism 70 coupled between the seat back 18 and the head restraint 26 for pivoting the head restraint 26 between the normal position and the forward angled position. More specifically, the adjustment mechanism 70 includes a generally rectangular guide plate 72 slidably coupled to each of the support rails 34, 36 and moveable along the support rails 34, 36 between a first, or lower, position and a second, or upper, position. Each guide plate 72 includes a leading edge 74 facing the seat cushion brackets 28, 30 and a trailing edge 76 opposing the leading edge 74. Each guide plate 72 further includes an upper edge 78 facing the head restraint 26 and a lower edge 80 opposing the upper edge 78. A guide slot 82 passes through each guide plate 72 and extends from a first end 84 adjacent the leading edge 74 and upper edge 78 to a second end 86 adjacent the trailing edge 76 and lower edge 80. The first and second distal ends 64, 66 of the control bar 62 are slidably received with the guide slots 82 of the respective guide plates 72 and guided between the first and second ends 84, 86 thereof.

The adjustment mechanism 70 further includes a generally U-shaped cover plate 90 fixedly secured, such as by welds or fasteners, to each of the support rails 34, 36 and defining a guide track therebetween for slidably retaining each of the respective guide plates 72 between the cover plate 90 and the respective support rail 34, 36. Each cover plate 90 includes a generally horizontal slot 92 therethrough for slidably receiving the first and second distal ends 64, 66 of the control bar 62 and for guiding the control bar 62 along the slots 82 in the guide plates 72. Each cover plate 90 further includes a pair of generally vertical slots 94 therethrough for slidably receiving fasteners 96. The fasteners 96 are fixedly connected to the guide plates 72 to retain the guide plates 72 within the guide track defined between the cover plates 90 and the respective support rails 34, 36.

The seat assembly 10 further includes an actuator 100 coupled between the seat cushion 12 and the adjustment mechanism 70 for automatically sliding the adjustment mechanism 70 between a first position pivoting the head restraint 26 to the normal position and a second position pivoting the head restraint to the forward angled position in response to pivotal movement of the seat back 18 between the upright position and the fully reclined position for continuously adjusting the position of the head restraint 26 relative to the seat occupant's head. More specifically, the actuator 100 in the preferred embodiment includes a pair of push-pull type cable assemblies 102. Each cable assembly 102 has a first end 104 fixedly secured to the lower edge 80 of the guide plate 72 and a second end 106 fixedly secured to the seat cushion bracket 28, 30, respectively. The cable assemblies 102 are routed along the support rails 34, 36 and recliner mechanism 24.

Finally, the seat assembly 10 further includes a spring bias member 110 connected between the seat back 18 and the adjustment mechanism 70 for continuously biassing the adjustment mechanism 70 to the second, or upper, position and the head restraint 26 to the forward angled position. That is, the spring bias member 110 includes a coiled spring extending and interconnected between the upper edge 78 of the guide plate 72 and the respective support rail 34, 36 for biassing the guide plates 72 upwardly along the guide track toward the second position, or in the direction of the cross rail 42.

Figure 3:
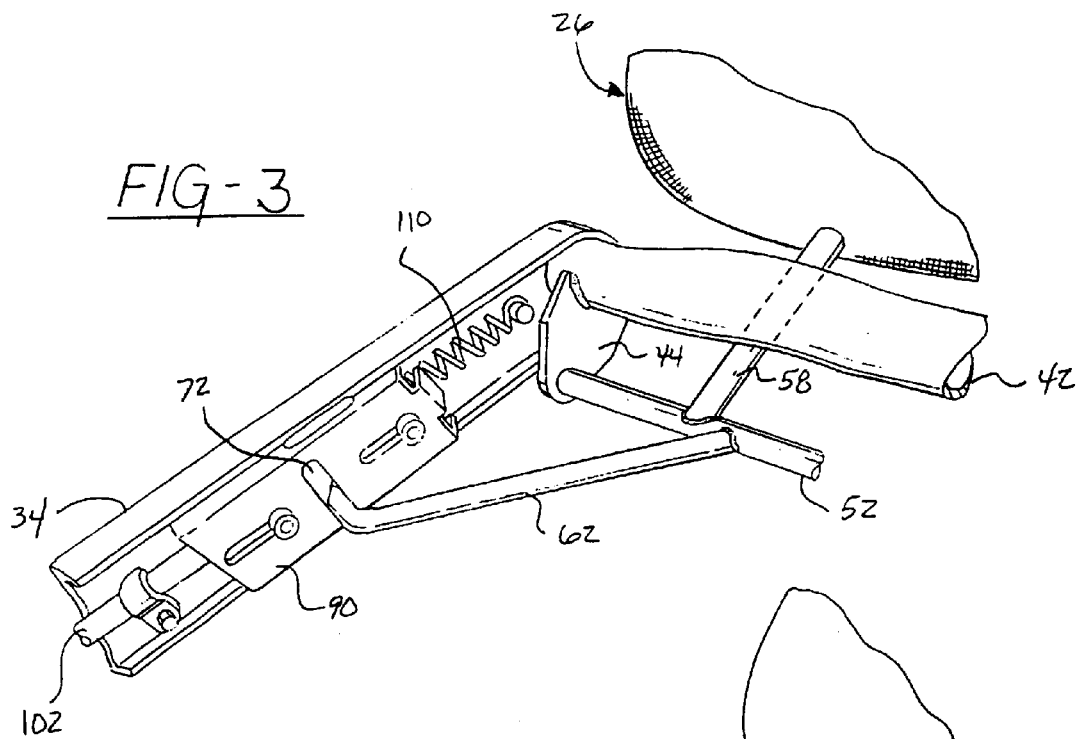
FIG. 3 is a fragmentary perspective view of the head restraint in the forward angled position and the adjustment mechanism in a second position.

Referring to FIG. 3, the adjustment mechanism 70 and actuator 110 are shown assembled to the support rail 34 and head restraint 26. The seat back 18 is shown in the fully reclined position with the head restraint 26 in the forward angled position thus minimizing the distance between the head restraint 26 and the seat occupant's head and providing supporting and protection against potential whiplash.

Figure 5:
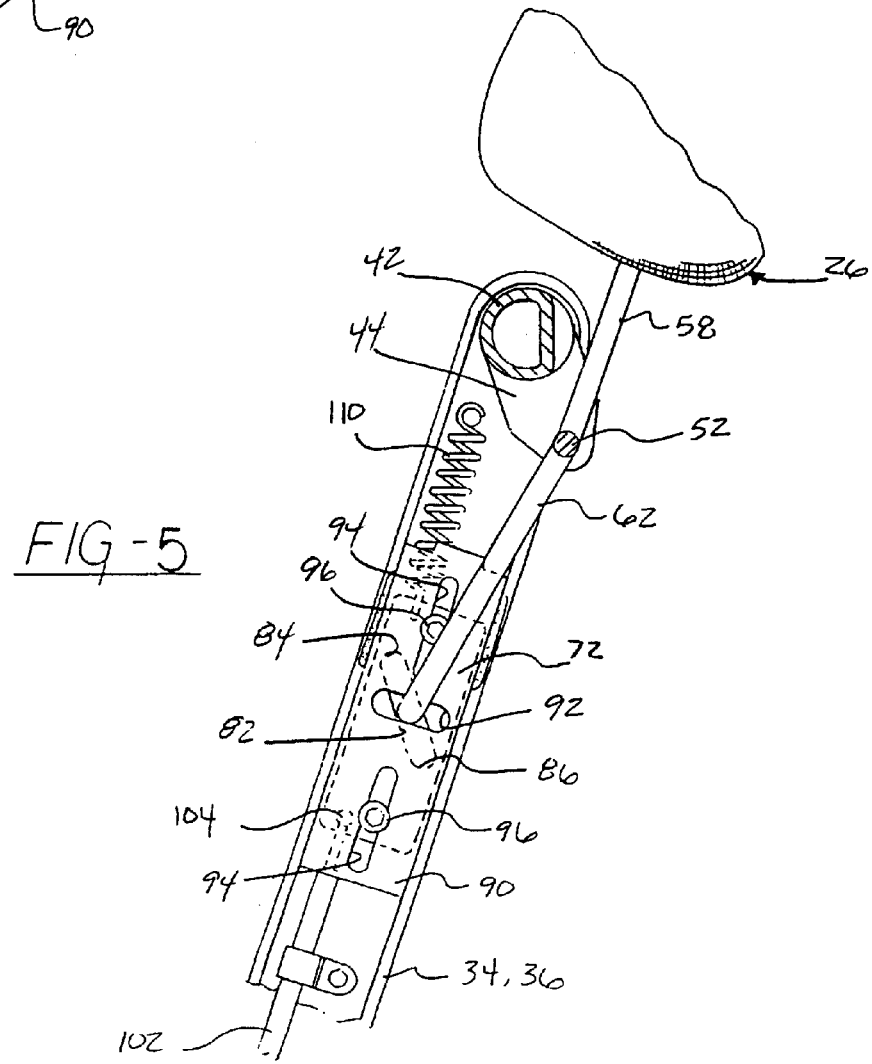
FIG. 5 is a fragmentary side view of the seat back partially reclined and the head restraint pivoted between the normal position and the forward angled position.
Figure 4:
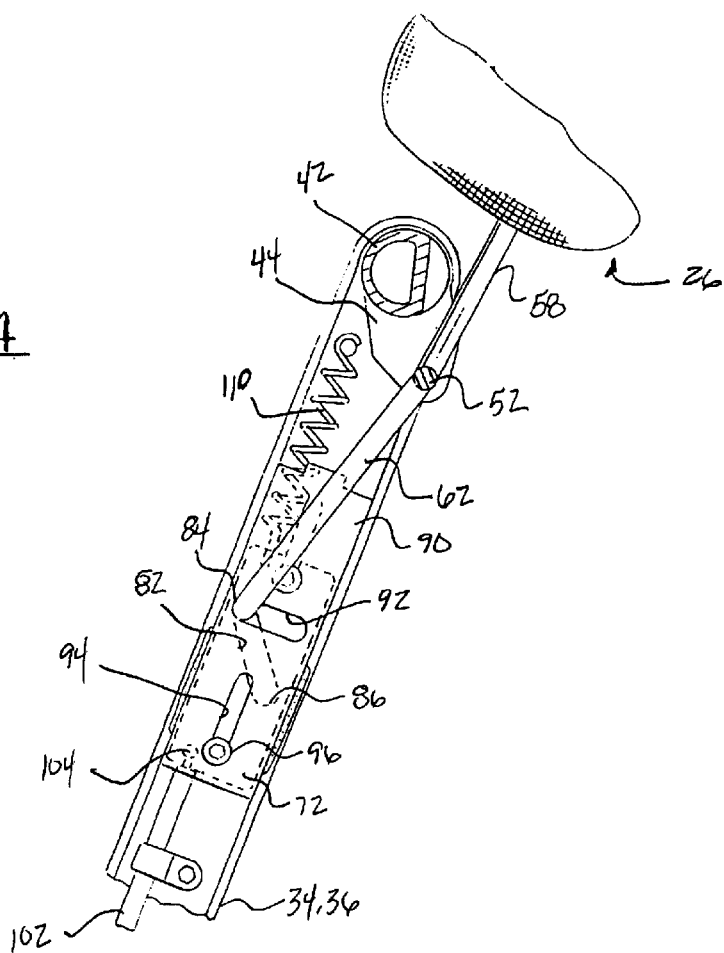
FIG. 4 is a fragmentary side view of the seat back in the upright position and the head restraint in the normal position.
Figure 6:
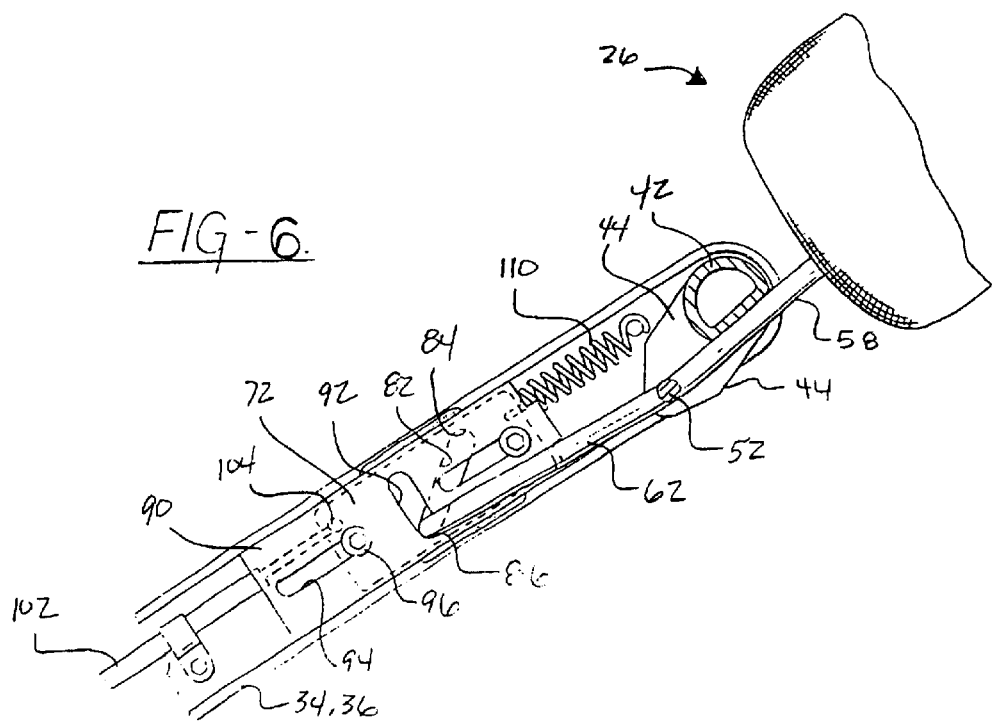
FIG. 6 is fragmentary side view of the seat back in the fully reclined position and the head restraint in the forward angle position.

Referring to FIGS. 4–6, the operation of the continuous self-adjusting head restraint 26 will now be described. Referring specifically to FIG. 4, the seat back 18 is shown in the upright position and the head restraint 26 in the normal position. The length of the cables 102 are shortened with the seat back 18 in the upright position by the curved routing of the cables 102 around the recliner mechanisms 24 and seat cushion brackets 28, 30. The shortening, or pulling, on the cables 102 forces the guide plates 72 to slide downwardly along the guide track between the support rails 34, 36 and the cover plates 90 to the first, or lower, position. In the first, or lower, position, the first and second distal ends 64, 66 of the control bar 62 are forced along the guide slot 82 to the first end 84 and the head restraint 26 is pivoted about the cross bar 52 to the normal position. Further, the springs 110 are pulled in tension against the force of the cables 102. As shown in FIG. 4, in the normal position, the head restraint 26 is spaced behind the upper cross rail 42 of the seat back frame 32.

Referring to FIG. 5, as the seat back 18 is pivoted rearwardly, or clockwise in FIG. 1, about the pivot axis A relative to the seat cushion 12, the cables 102 are lengthened due to reducing the bend or curve in the cables 102 around the recliners 24 and brackets 28, 30 producing slack in the cables 102. The springs 110 force the guide plates 72 to slide upwardly towards the cross rail 42. The guide plates 72 travel along the cover plates 90 with the fasteners 96 travelling along the vertical slots 94 therein. The travel of the guide plates 72 forces the distal ends 64, 66 of the control bar 62 to slide along the guide slot 82 from the first end 84 toward the second end 86. Since the guide slots 82 are angled from the leading edge 74 and upper edge 78 to the trailing edge 76 and lower edge 80, the control bar 62 is forced to move rearwardly and pivot the head restraint 26 about the cross bar 52 in the counterclockwise direction as shown. That is, the head restraint 26 is pivoted toward the upper cross rail 42 of the seat back 18 and thus gradually closer to the seat occupant's head as the seat back 18 is reclined.

Referring now to FIG. 6, as the seat back 18 is pivoted further rearwardly, or clockwise in FIG. 1, about the pivot axis A to the fully reclined position relative to the seat cushion 12, the head restraint 26 is pivoted to the fully forward angled position. More specifically, the cables 102 continue to increase in length and allowing the springs 110 to force the guide plates 72 to slide upwardly towards the cross rail 42 to the second, or upper, position. The guide plates 72 travel along the cover plates 90 until the fasteners 96 reach the top ends of the vertical slots 94. This travel of the guide plates 72 further forces the distal ends 64, 66 of the control bar 62 to continue to slide along the guide slots 82 from the first end 84 to the second end 86. Again, since the guide slots 82 are angle, the control bar 62 is forced to move rearwardly and pivot the head restraint 26 about the cross bar 52 in the counterclockwise direction as shown. As shown in FIG. 6, the head restraint 26 is immediately adjacent to the upper cross rail 42 in the fully forward angled position. The horizontal slots 92 in the cover plates 90 allow the control bar 62 to travel along the guide slots 82 from the first end 84 to the second end 86 which span across the guide plates 72 from the leading edge 74 to the trailing edge 76.

As the seat back 18 is pivoted and return from the fully reclined position toward the upright position, the cables 102 are wound around the recliners 24 and brackets 28, 30 to shorten the length of the cables 102 and pull downwardly on the respective guide plates 72 against the force of the springs 110. The guide plates 72 slide downwardly along the cover plates 90 against the force of the springs 110 until the fasteners 96 reach the bottom of the vertical slots 94. The guide slots 82 again force the distal ends 64, 66 of the control bar 62 to slide and travel along the slots 82 from the second end 86 toward the first end 84. The angled guide slots 82 in turn force the head restraint 26 to pivot about the cross bar 52 rearwardly, or clockwise as shown, to move the head restraint 26 from the forward angled position to the normal position.

Therefore, the head restraint 26 is automatically and continuously adjusted and pivoted relative to the seat back 18 in response to pivotal movement of the seat back between the upright position and the fully reclined position. It should be appreciated that the arrangement of the springs 110, cables 102 and guide slots 82 may be reverse such that the springs 110 bias the guide plates 72 to the upper position and the cables 102 pull the guide plates 72 downwardly upon pivoting the seat back 18 from the upright position to the fully reclined position. That is, the length of the cable 102 may be shortened or pulled in tension as the seat back 18 is pivoted toward the fully reclined position in order to pull downwardly on the guide plates 72 against the bias force of the springs 110. The angle or direction of the guide slot 82 may then be opposite, or a mirror image, to force the head restraint 26 to pivot from the normal position to the forward angled position and the seat back 18 is pivoted and the guide plates 72 slide downwardly along the cover plates 90.

The invention has been described in an illustrative manner, and it is to be understood that the terminology, which has been used, is intended to be in the nature of words of description rather than of limitation.

Many modifications and variation of the present invention are possible in light of the above teachings. It is, therefore, to be understood that within the scope of the appended claims, the invention may be practised other than as specifically described.

What is claimed is:

1. A seat assembly for use in an automotive vehicle comprising:
    a generally horizontal seat cushion for supporting a seat occupant on said seat assembly;
    a seat back pivotally couple to said seat cushion for pivotal movement between a generally upright position and a fully reclined position relative to said seat cushion;
    a head restraint pivotally coupled to said seat back for pivotal movement between a normal position when said seat back is in said upright position and a forward angled position relative to said seat back when said seat back is in said fully reclined position to support the seat occupant's head;
    an adjustment mechanism slidably coupled between said seat back and said head restraint for pivoting said head restraint between said normal position and said forward angled position;
    an actuator coupled between said seat cushion and said adjustment mechanism for automatically sliding said adjustment mechanism between a first position pivoting said head restraint to said normal position and a second position pivoting said head restraint to said forward angled position in response to pivotal movement of said seat back between said upright position and said fully reclined position for continuously adjusting the position of said head restraint relative to the seat occupant's head;
    a spring bias member connected between said seat back and said adjustment mechanism for continuously biasing said adjustment mechanism to said second position and said head restraint to said forward angled position; and
    said head restraint including a support frame comprising a cross bar extending between opposing first and second ends pivotally connected to said seat back, at least one upstanding post extending upwardly from said cross bar for supporting a head restraint cushion, and a control bar extending between opposing first and second distal ends operatively connected to said adjustment mechanism for pivoting said head restraint about said cross bar between said normal position and said forward angled position.

2. A seat assembly as set forth in claim 1 wherein said seat back includes a seat back frame comprising a pair of spaced apart and generally parallel upright support rails, each extending from a lower end to an upper end, and an upper cross rail interconnecting said upper ends of said support rails.

3. A seat assembly as set forth in claim 2, wherein said adjustment mechanism includes a guide plate slidably coupled to each of said support rails and movable along said support rails between said first and second positions.

4. A seat assembly as set forth in claim 3, wherein said guide plates each comprise a generally rectangular plate having a leading edge facing said seat cushion, a trailing edge opposing said leading edge, an upper edge facing said head restraint and a lower edge opposing said upper edge.

5. A seat assembly as set forth in claim 4, wherein said guide plates each include a guide slot extending from a first end adjacent said leading edge and said upper edge and a second end adjacent said trailing edge and said lower edge for slidably receiving and guiding said respective distal ends of said control bar therebetween.

6. A seat assembly as set forth in claim 5 wherein said adjustment mechanism includes a cover plate fixedly secured to each of said support rails defining a guide track therebetween for slidably retaining each of said guide plates between said respective support rail and cover plate.

7. A seat assembly as set forth in claim 6, wherein said spring bias member includes a coiled spring extending between each of said guide plates and said respective support rail for biassing said guide plates toward said second position and said head restraint toward said forward angled position.

8. A seat assembly as set forth in claim 7 wherein said actuator includes a cable extending from each of said guide plates to said seat cushion for sliding said guide plates along said guide track from said first position to said second position in response to said seat back pivoting from said upright position to said fully reclined position to automatically pivot said head restraint from said normal position to said forward angled position.

* * * * *

UNITED STATES PATENT AND TRADEMARK OFFICE
CERTIFICATE OF CORRECTION

PATENT NO.   : 6,485,096 B1
DATED        : November 26, 2002
INVENTOR(S)  : Azar et al.

It is certified that error appears in the above-identified patent and that said Letters Patent is hereby corrected as shown below:

Column 1,
Line 63, delete "in" and insert -- position -- therefor;

Column 2,
Line 14, delete "angle" and insert -- angled -- therefor --;

Column 3,
Lines 57 and 62, delete "biassing" and insert -- biasing -- therefor;

Column 4,
Line 9, delete "are" and insert -- is -- therefor;
Line 47, delete "allowing" and insert -- allow -- therefor;
Line 55, delete "angle" and insert -- angled -- therefor;
Line 63, delete "return" and insert -- returned -- therefor;

Column 5,
Line 16, delete "reverse" and insert -- reversed -- therefor;
Line 42, delete "couple" and insert -- coupled -- therefor.

Signed and Sealed this

Fourth Day of March, 2003

JAMES E. ROGAN
*Director of the United States Patent and Trademark Office*